United States Patent [19]
Brown
[11] Patent Number: 5,060,255
[45] Date of Patent: Oct. 22, 1991

[54] TELECOMMUNICATIONS SYSTEM WITH TIMED-DO-NOT-DISTURB

[75] Inventor: James L. Brown, Ellicott City, Md.
[73] Assignee: Bell Atlantic Network Services, Inc., Arlington, Va.

[21] Appl. No.: 514,472
[22] Filed: Apr. 25, 1990
[51] Int. Cl.⁵ ............ H04M 3/42
[52] U.S. Cl. ............ 379/67; 379/188; 379/201; 379/211; 379/214; 379/197; 379/88
[58] Field of Search ............ 379/67, 88, 89, 201, 379/210, 211, 214, 213, 207, 197, 198, 196

[56] References Cited

U.S. PATENT DOCUMENTS

| | | | |
|---|---|---|---|
| 3,226,469 | 12/1965 | Grambsch . | |
| 4,232,199 | 11/1980 | Boutwright et al. | 379/197 |
| 4,405,839 | 9/1983 | Groff | 379/199 |
| 4,720,848 | 1/1988 | Akiyama | 379/88 |
| 4,736,405 | 4/1988 | Akiyama | 379/89 |
| 4,878,240 | 10/1989 | Lin et al. | 379/67 |
| 4,893,329 | 1/1990 | O'Brien | 379/88 |

*Primary Examiner*—James L. Dwyer
*Attorney, Agent, or Firm*—Lowe, Price, LeBlanc and Becker

[57] ABSTRACT

Disclosed in an apparatus and method for effecting timed-do-not-disturb services in telephone networks. An adjunct computer is associated with the Remote Memory Administration System (RMAS) for switches which include a facility for providing call forwarding services. The adjunct computer is inserted between the RMAS and the switches which it controls. The adjunct includes a processor responsive to subscriber identification and stored class of service information to recognize that timed-do-not-disturb service is to be provided to an identified subscriber station. The processor receives requests for timed-to-not-disturb service via a multiline hunt group associated with a do-not-disturb access number associated with a voice response unit which feeds request signals to the processor and voice prompts to the caller. The processor determines the identity of the subscriber station which is to receive the requested service and the time of the service and generates a programming signal and formats the signal for compatibility with the switch to which the station is connected. The processor also transmits to the switch recent change programming signals originating in the RMAS as well as the programming signals to effectuate the timed-do-not-disturb service. Following programming of the switch incoming calls for the do-not-dusturb subscribers are forward to the adjunct which provides announcement to the caller.

12 Claims, 2 Drawing Sheets

40 38 42 16 22 VRU 24 18 HOST C.O. 44 DND PROCESSOR CLOCK 20 28 46 37 RMAS 26 30 12 SERVING C.O. 18 10 32 34 36 14 FOREIGN C.O. 16

TELECOMMUNICATIONS SYSTEM WITH TIMED-DO-NOT-DISTURB

TECHNICAL FIELD

The present invention relates generally to telecommunications systems and more particularly to a method and system for providing a timed-do-not-disturb service.

RELATED APPLICATION

This application is related the common assignee's co-pending application Ser. No. 07,505,386 filed Apr. 6, 1990, for Method of and System for Control of Special Services by Remote Access.

BACKGROUND ART

A need has been identified for a service which will provide to residential customers a control over their telephone service to permit work or relaxation without the normal interruptions caused by a ringing telephone. Such a service must be easy to use, economically priced, and must provide courteous handling of incoming calls.

In recent years a do-not-disturb service has been commonly offered in PBX systems and has been proposed for central offices equipped with the more modern stored program control (SPC) electronic switches. Such switches are typified by the 1AESS and 5AESS electronic switching systems manufactured by American Telephone & Telegraph (AT&T) Corporation. See, for example, U.S. Pat. No. 3,826,876 to Gueldenphenning et al, issued July 30, 1974; U.S. Pat. No. 4,232,199 to Boatwright et al, issued Nov. 4, 1980; U.S. Pat. No. 4,720,848 to Akiyama, issued Jan. 19, 1988; and U.S. Pat. No. 4,878,240 to Lin et al, issued Oct. 31, 1989.

The Lin et al patent discloses an arrangement providing enhanced telephone services which include call screening with a do not disturb feature. To provide such services the Lin et al arrangement provides each subscriber with two telephone numbers. One number is the published number which is known to the telephone switch and is the number that the public would dial to reach the subscriber. The other number is known only to an adjunct which is provided for the switch. Incoming calls to the subscriber's published number are routed by the telephone switch (as through a call forwarding feature) to the adjunct where it is then routed through an additional programmable switch for the duration of the call. Based upon the services subscribed to by the called party and based upon the condition of his telephone line (i.e., answered, busy or not answered), the call is routed to the other adjunct known number of the called party. The adjunct then causes the ringing of the subscriber's telephone, or if call forwarding is activated, to ring the published number of the forwarding party in order to ring the telephone there. This arrangement involves a significant investment in sophisticated adjunct equipment and a basic change in the way switching is handled in a central office switching system.

Other forms of do-not-disturb service or substitutes therefor have been available using various types of customer premise equipment. See, for example, U.S. Pat. No. 3,226,489 to Grambsch, issued Dec. 28, 1965; U.S. Pat. No. 3,867,584 to Rengren, issued Feb. 18, 1975; and U.S. Pat. No. 3,673,339 to Korn, issued June 27, 1972.

Still other currently available options to telephone interruptions include telephone answering machines, answering services, and receiver off-hook. While each of these options provides some relief from unwanted telephone calls each also carries its own inherent disadvantages. Thus the receiver off-hook option tends to aggravate callers when they receive busy signals on repeated calls. Still further, the user must remember to replace the receiver and go back on-hook. Answering machines and other customer premise equipment options entail a relatively high equipment investment along with maintenance costs. Answering machines further do not eliminate an unwanted ringing telephone. Voice Mail also entails a ringing of the telephone before the call is transferred to the Voice Mailbox. Both answering machines and Voice Mailbox involve a feeling of obligations to return the calls.

SUMMARY OF THE INVENTION

It is accordingly an object of the present invention to provide for residential telephone customers an easy to use and economical means for eliminating unwanted telephone ringing without discourtesy to unanswered callers.

It is a further object of the present invention to provide a network adjunct node arranged to provide a new and improved apparatus and method for effecting a timed-do-not-disturb service.

It is another object of the invention to provide an improved apparatus and system for providing a timed-do-not-disturb service utilizing existing local telephone network equipment and procedures in conjunction with an adjunct node interacting with the preexisting equipment and procedures.

It is another object of the invention to provide effective timed-do-not-disturb telephone service using equipment that is low in cost, easily implemented and easy to use.

It is another object of the present invention to provide a timed-do-not-disturb service which in one embodiment may be controlled by the subscriber from any telephone station.

It is another object of the invention to provide an improved timed-do-not-disturb service in a telephone network having multiple types of SPC switches programmably by a Remote Memory Administration System (RMAS) which may be implemented by adjunct equipment associated with the RMAS.

It is another object of the invention to provide an improved timed-do-not-disturb service which may be implemented from centralized nodes assuring that human interface to the service is uniform across multiple types of switching systems.

It still another object of the invention to provide a platform for implementing timed-do-not-disturb services which may also provide additional special or enhanced services.

The above and other objects of the invention are satisfied, at least in part, by providing, at a central office serving subscriber lines an adjunct computer system inserted between the RMAS and the input channel to the switching system. The new service and system arrangement will permit a customer to program a period of time where all incoming calls will be routed to an announcement such as:

"I am sorry. The party you are calling has requested no interruptions until after 8 p.m. Please call again after 8 p.m. Thank you."

The time quoted in the announcement will be selected by the customer each time the service is used. While the timed-do-not-disturb service is activated, outgoing calls will be unaffected. At the end of the programmed time period the customer's service will automatically be restored to normal operation. At the option of the customer a notification of deactivation can automatically be called in to the customer. This service can be provided via a network architecture which utilizes a centralized adjunct processor with voice response units. The required hardware and technology are readily available.

Thus it is an object of the invention to provide in a telecommunications system having a plurality of switching means interconnected by trunks, a plurality of subscriber stations arranged in groups with each group being served by one of the switching means, a plurality of subscriber lines connecting each switching means with the group of subscriber stations served thereby, a switching network in each switching means for establishing communication paths between calling subscriber stations and called subscriber stations addressed by the calling stations, with at least one of the switching means including means for providing call forwarding services to subscriber stations which it serves, and a Remote Memory Administration System (RMAS) or the like associated with the switching means for programming switch translation variables, the improvement comprising adjunct means associated with the RMAS and connected to at least one of the switching means which is adapted to provide call forwarding services to subscriber stations which it serves, a multiline hunt group associated with a special access number where the adjunct means includes voice response means associated with the multiline hunt group, and processor means which is responsive to subscriber identification and stored class of service information for recognizing that a timed-do-not-disturb service is to be provided to a subscriber station connected to one of the switch means, and which processor is capable of generating a signal for programming the switch means so as to effect the modification necessary to provide the call forwarding and timed-do-not-disturb service to that subscriber station, and wherein the processor means is connected between the RMAS and at least one of the switch means for transmitting to the switch means signals from the RMAS for programming switch translation variables.

Still other objects and advantages of the present invention will become readily apparent to those skilled in the art from the following detailed description, wherein only the preferred embodiments of the invention are shown and described, simply by way of illustration of the best mode contemplated of carrying out the invention. As will be realized, the invention is capable of other and different embodiments, and its several details are capable of modification in various other respects, all without departing from the invention. Accordingly, the drawing and description are to be regarded as illustrative in nature, and not as restrictive.

DETAILED DESCRIPTION

Figure 1:
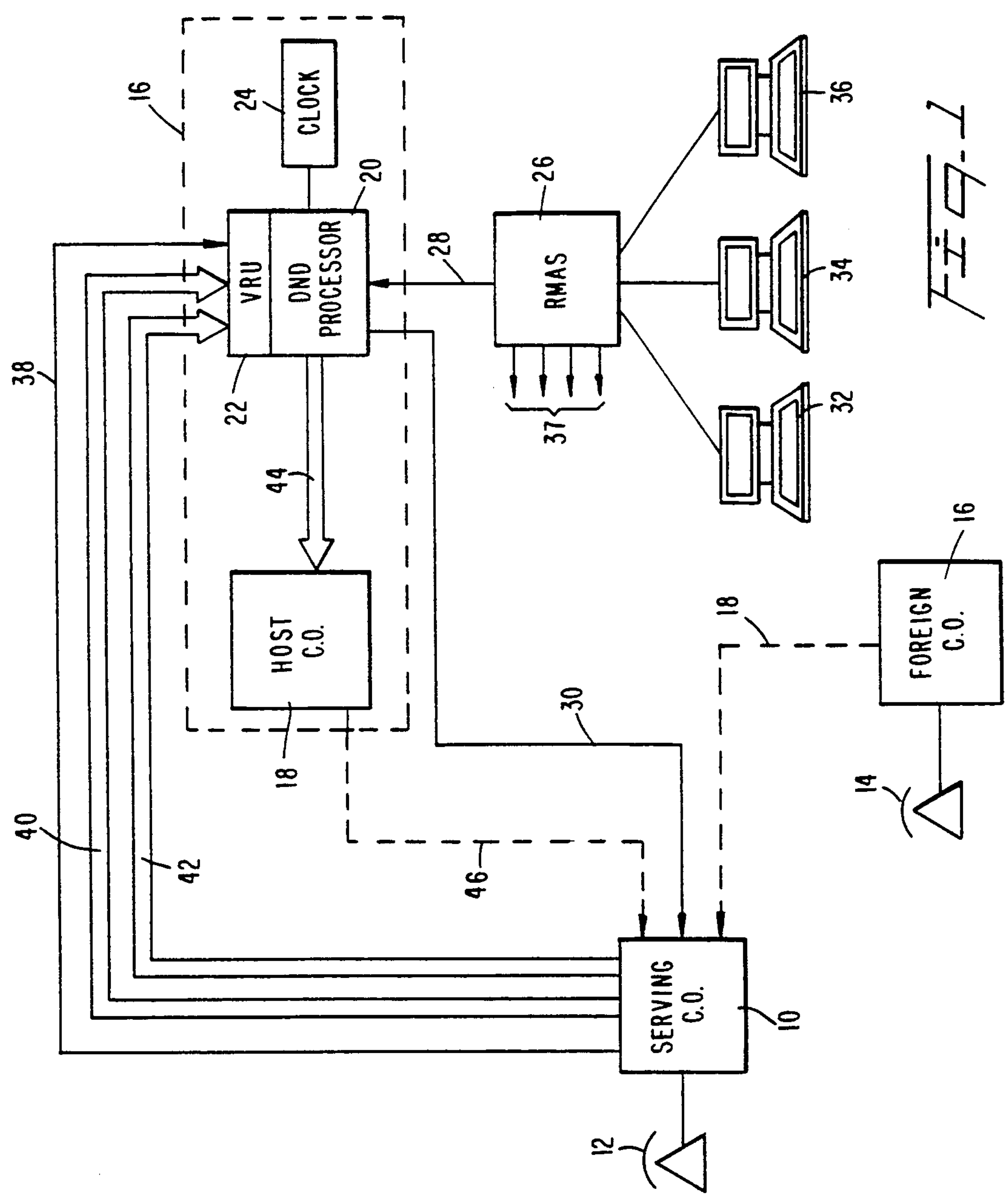
FIG. 1 is a diagram showing a preferred embodiment of a timed-do-not-disturb system constructed in accordance with one embodiment of the invention.

Referring to FIG. 1 there is shown a preferred embodiment of the invention wherein timed-do-not-disturb service is effectuated. In FIG. 1 there is seen a conventional local telephone network comprising a central office 10 which serves a series of customers including a timed-do-not-disturb customer represented at station 12. A caller for station 12 may utilize a remote station 14 to communicate with station 12 via a remote or foreign central office 16, IOF Trunk 18 and serving or local central office 10.

The switch 10 is a stored program control switch. As will be understood, such electronic switches are computer controlled with the specific switching functions implemented in a series of software routines which are commonly referred to as generics. These generics are developed by the switch manufacturer and loaded into the switch for subsequent use at the local switching office. Through the generics the switch is able to provide a predefined selection of enhanced services to any local customer that is connected to the switch.

The SPC switch 10 is assumed to have generics which include a Call Forwarding Variable (CFV) and an Activation/Deactivation Flag (A/D) for each subscriber loop terminating on the switch. Only the loop to the customer station 12 is illustrated in FIG. 1. For any incoming call, if the primary destination directory number (DN) A/D flag is in the activated switch, the switch performs a translation on the call to route it to the forwarded destination DN contained in the CFV.

According to the invention the telephone network is provided with a special services adjunct 16 which is preferably located at a host central office 18. The adjunct 16 includes a fault-tolerant computer processor 20 which includes a Voice Response Unit (VRU) 22. By way of example, the fault-tolerant computer may be a Sequoia Model 200, a 68020 based computer, and the VRU may be a Periphonics Voice Response Unit. This unit provides digitized recorded voice. A voice synthesizer may alternately be used but with some loss of quality. The adjunct also includes a clock 24 to provide the time of day for the adjunct.

A Remote Memory Administration System (RMAS) 26 is connected to program the SPC switches in central offices 10, 16 and 18. RMAS is a commercial designation used to refer to a computer which is adapted to respond to input signals to generate so called "Recent Change" signals to Stored Program Control (SPC) switching systems to effect changes to line and trunk translations that have not been merged with the data base. As will be understood, such switches are controlled by a switch computer whereby the specific switching functions are implemented in a series of software routines which are commonly referred to as generics. The switch computers are distinct from the RMAS computer. The generics are developed by the switch manufacturer and loaded into the switch for use at the local switching office.

The RMAS 26 is connected to the SPC switch in central office 10 through the processor 20 via Recent Change Channels 28 and 30. The Recent Change Channel is a general purpose I/O port used for programming switch translation variables including the CFV and A/D. A series of technician or RCMAC terminals 32, 34 and 36 are connected to access the RMAS. The RMAS provides service technicians or operators with formatted CRT screens at terminals 32, 34 and 36 to enter service orders. The RMAS translates the screen inputs into proper Recent Change requests and submits them to the appropriate CO switch in an orderly fashion. With the illustrated switch 10 the adjunct 16 is connected between the RMAS and the switch or central office 10. This arrangement provides the ability to handle earlier switches of the 1ESS and 1AESS type which have only a single recent change input port. The adjunct computer is programmed to intercept and buffer messages from the RMAS system to the switch. This provides the ability to insert high priority messages into the normal traffic stream. Thus the short message resulting from a subscriber request to activate or deactivate TDND may be inserted into the recent change channel traffic stream immediately.

The connection of the SPC switch to the RMAS through the processor creates a contention situation which is handled by buffer memory and software in the processor. Thus when no requests are pending in the adjunct for the particular central office or switch, the processor acts as a "dumb pipe". That is, the RMAS and central office messages flow through the processor without modification or delay. However, if a call forwarding recent change message is formatted and ready for release to the central office or switch, the following occurs: If a RMAS message is in progress (moving through the adjunct) it is allowed to continue and the response from the central office is allowed to pass also. However, the next message from the RMAS is buffered (stored) in the processor. The call forward message is then released to the central office or switch and the central office response is collected. Then the buffered RMAS message is released to the central office or switch and the response returned. The call forwarding messages are completed and the RMAS obtains its response from the central office or switch before it times out. As a result the adjunct appears to be transparent to the RMAS system even though there may actually be a delay of multiple seconds. In effect there is a multiplexing action of the call forwarding recent change formatted messages or signals and the RMAS recent change messages or signals.

The processor 20 is connected to the switch 10 by a Simplified Message Desk Interface (SMDI) link such as link 38 connecting the processor to the serving central office 10. The processor is also provided with a service activation multiline hunt group 40 which may be accessed by the central office 10. The processor 20 is further provided with a second multiline hunt group 42 which may be accessed by the central office 10 to provide call forwarding to the announcement. Notice of deactivation lines 44 are connectable to the host central office switch 18 for the purpose of originating calls to central office 10 using existing IOF trunk 46 by way of example.

While the system illustrated in FIG. 1 is described in terms of a single switch or central office 10 providing timed-do-not-disturb service it will be understood that the adjunct 16 ordinarily will control multiple central offices or switches to provide such service in an extended area. An RMAS system and the associated Recent Change Administration Center may typically handle approximately 80 central offices. Control links to such offices are indicated graphically at 37 in FIG. 1. Additional detail is presented in assignee's aforesaid co-pending Application which is incorporated herein by reference.

The system illustrated in FIG. 1 operates as follows A subscriber to the TDND service will dial the TDND directory number. Following the dialing of the TDND directory number the subscriber's local central office 10 will connect to the TDND processor 20 in adjunct 16 via the dedicated service activation multiline hunt group 40. Substantially simultaneously the subscriber's telephone number will be passed to the processor 20 over the SMDI or equivalent link 38. The processor 20 will then verify that this customer subscribes to the service and check the current status of TDND for this customer, i.e., activated or not, to determine the next action to take.

If the TDND service is not activated, the processor 20 will use voice prompts to the customer via the service activation MLHG 40 to determine the time of day when the customer wants the line restored to normal service. The customer will input the time via his station key pad and a voice message will play back to the customer the requested time for restoral to normal service. Mistakes made while inputting the time may be corrected in known fashion as will be understood.

Assuming that the notification of deactivation feature is provided, the customer will next be asked if he wants the notification at the end of his usage of the TDND service. The customer will key a "yes" or "no" response as directed by the voice prompt, usually by entering a prompted digit.

When this programming is completed the processor 20 will generate a message over the recent change channel 30 to activate call forwarding on that customer's line. After such TDND call forwarding has been activated incoming calls to the customer or subscriber will be forwarded or directed to the TDND announcement over the announcement hunt group 42. The processor 20 now has a record of the specific time that this customer desires the line restored to normal service and is informed as to whether or not the customer desires a notice of deactivation. Also the local or serving central office 10 is now programmed to transfer all incoming calls to customer 12 to the processor 20 via the multiline hunt group 42.

When an incoming call is forwarded to the processor 20 the telephone number of the TDND customer is transmitted to the processor over the SMDI link 38. The processor then checks its file for the time to quote in the announcement provided to this caller. The announcement may be something like:

"I am sorry. The party you are calling has requested no interruptions until after 8 p.m. Please call again after 8 p.m. Thank you."

The processor 20 will then provide a disconnect signal. While this TDND service is activated there will be no ringing of the customer's telephone to indicate when calls are being transferred. This may be accomplished by deactivating the conventional reminder ring associated with the call forwarding service. However outgoing calls may be made while the service is activated. The customer is able to deactivate the TDND service at any time prior to the programmed automatic deactivation. At the specified time for deactivation, the processor will generate a message over the recent change channel 30 to cancel call forwarding from this customer's line at the serving central office 10.

If the notice of deactivation was, selected on this usage, the processor will also originate a call to the customer at station 12 over one of the notification of deactivation lines 44 via host office 18, IOF trunk 46 and serving central office 10. If the customer goes off-hook within a predetermined number of rings (5 or 6), a recording will inform him that the TDND service has been deactivated and his normal service restored. If there is no answer within the predetermined number of rings, the processor will disconnect. The processor's temporary memory associated with this customer's file will then be erased and made ready for the next usage.

In the operation of the embodiment of the invention just described in relation to FIG. 1 the activation of the TDND service was accomplished from the subscribing or customer telephone station. It is also possible to provide for remote access to TDND activation.

In order to avoid the need for a subscriber to use his/her own subscribing telephone station with respect to the enhanced service of call forwarding it has been proposed to provide a new feature which has been referred to as Remote Access to Call Forwarding (RACF). With Remote Access to Call Forwarding a subscriber may utilize any telephone, dial a special access number, followed by a Personal Identification Number (PIN), and then dial additional codes in order to activate or deactivate the Call Forwarding feature. The personal identification or PIN number is a security mechanism to prevent accidental or malicious interference with the service.

In the common assignee's previously mentioned copending Application there are described several approaches to providing a service of the foregoing type including the new and improved service and system which constitute the subject matter of that application. Such application is incorporated by reference as fully as if reproduced herein.

Figure 2:
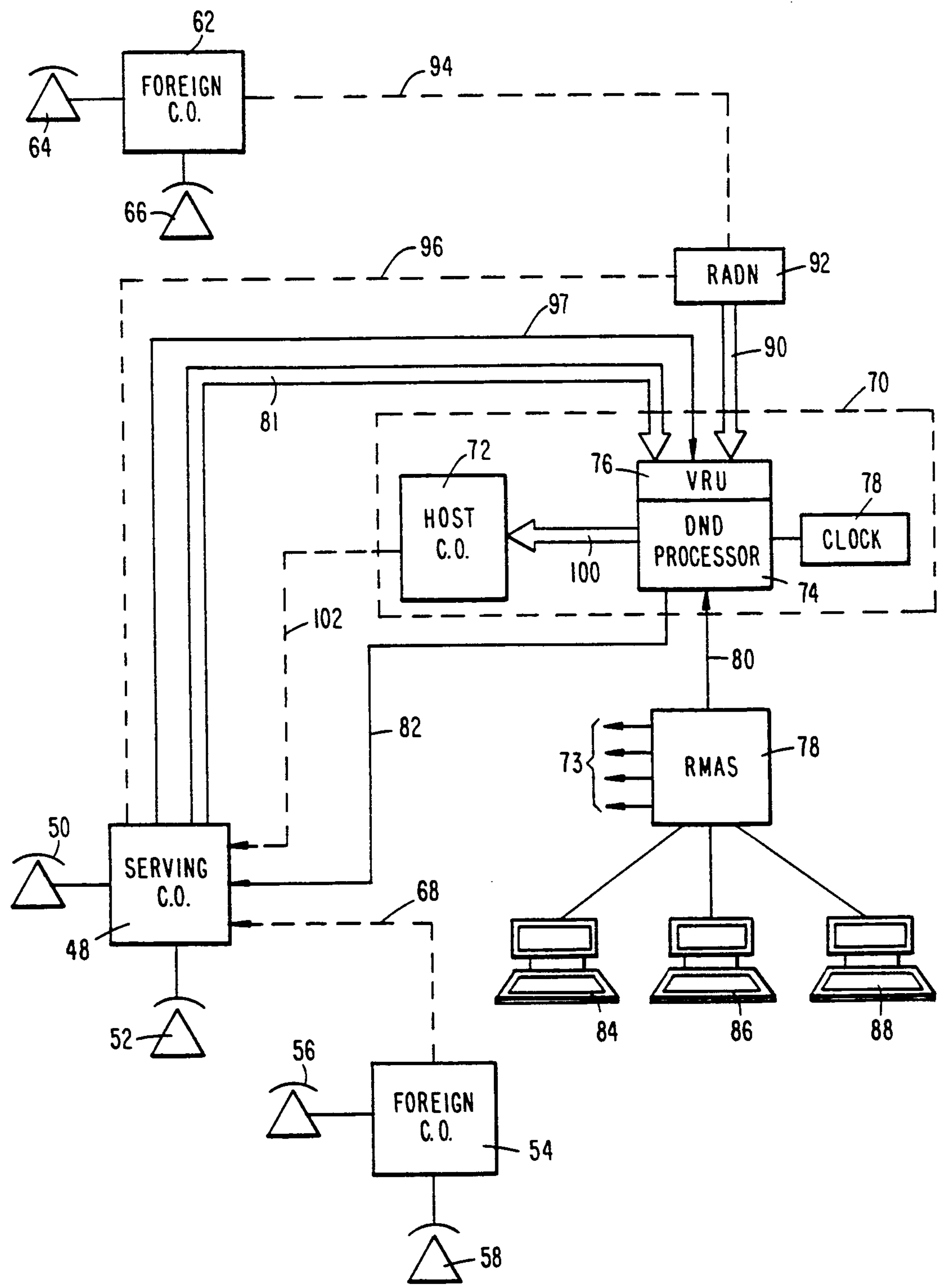
FIG. 2 is a diagram showing a second embodiment of a timed-do-not-disturb system which provides remote access to actuation.

Referring to FIG. 2 there is shown an embodiment of the invention which provides remote access to the TDND service. In FIG. 2 there is seen a serving central office 48 connected by local loops to subscriber stations served thereby such as the illustrated stations 50 and 52. The SPC switch in central office 48 is assumed to have generics which include a Call Forwarding Variable (CFV) and an activation/deactivation flag (A/D) for each subscriber loop terminating on the switch. A first remote or foreign central office 54 is connected by local loops to the stations served thereby which are here represented by the illustrated stations 56 and 58. A second remote or foreign central office is illustrated at 62 and is connected through local loops to the stations which it serves which are here illustrated by stations 64 and 66. The remote central offices 54 and 62 are connectable to the serving central office 48 through IOF trunks such as illustrated at 68 between central offices 48 and 54.

According to the invention the telephone network in FIG. 2 is provided with a special services adjunct 70 which is preferably located at a host central office 72. The adjunct 16 includes a fault-tolerant computer processor 74 which includes a Voice Response Unit (VRU) 76 in the same manner as described in connection with FIG. 1.

A Remote Memory Administration System (RMAS) 78 is connected to program the SPC switches in central offices 48, 54 and 72 as well as additional central offices as indicated graphically at 73. The RMAS 78 is connected to the SPC switch in central office 48 through the processor 74 via recent change channels 80 and 82. A series of technician or RCMAC terminals 84, 86 and 88 are connected to access the RMAS.

Connected to the processor 74 is a service activation multiline hunt group 90 associated with a TDND directory number or Remote Access Directory Number (RADN) 92. The processor may be reached by any of the central offices 48, 54, 62 and 73 over IOF trunks such as illustrated at 94 and 96 connecting central offices 48, 62 to the RADN 92 and multiline hunt group 90 to the processor 74. The processor is also connected to the serving central office 48 by an SMDI link 97 and associated with the DND announcement multiline hunt group line 81 as described in connection with the embodiment of the invention illustrated in FIG. 1. The adjunct 70 is also provided with a time of day clock 98 and is connected to the host central office 72 by notification of deactivation lines 100.

The system illustrated in FIG. 2 operates as follows: A subscriber to the TDND service may dial the TDND directory number or RADN 92 through any telephone station such as station 64 connected to the RADN through central office 62 and IOF trunk 94. Connection is thereupon made to the processor 74 via the multiline hunt group 90. The subscriber dials the TDND directory number or RADN which is assigned to and terminates at the TDND adjunct 70 at the end of multiline hunt group 90. The VRU 76 provides a prompt such as:

"This is your timed-do-not-disturb service. You may dial your home telephone number that has timed-do-not-disturb service. Please dial now."

The user then dials his/her home number. The dialed digits are collected at the processor 74 until all are received. A prompt of the following type is next played:

"The number you have dialed is xxx-xxxx. If this is correct dial your Personal Identification Number."

The user dials a multiple digit PIN number. After these digits are collected and stored, a database search is performed in the adjunct for the combined DN and PIN for validation purposes.

Assuming a valid number has been received a prompt of the following type is played:

"To activate timed-do-not-disturb dial 10#. To deactivate timed-do-not-disturb dial 12#. Please dial now."

It will be understood that other codes may of course be used.

Assuming the user dials 10# to attempt to activate timed-do-not-disturb, and also assuming that timed-do-not-disturb has not previously been activated, a prompt of the following type is played:

"You have accessed the timed-do-not-disturb activation feature. To confirm this feature dial (1). To try a different feature dial (0) and another code. Please dial now."

Assuming the user dials (1) to confirm, the activation sequence is started and a prompt of the following type is played:

"This is your timed-do-not-disturb service. Please dial the time when normal service is to be restored."

The user dials the time using the key pad. The adjunct stores and replays the dialed digits and requests the user to dial (1) if the number is correct or (0) followed by a new time indication. If the user confirms the time a prompt of the following type is played:

"Do you desire notice of deactivation of the timed-do-not-disturb feature? To activate such notification dial (1). If you do not desire such notification dial (0)."

After the user has dialed a (1) or (0) a prompt of the following type is played:

"Your request is being processed. Please hold."

The adjunct processor 74 now formats and initiates an appropriate message to the affected switch which will thereafter forward calls made to the customer subscriber's number to the TDND announcement over the announcement hunt group 81. The processor 74 now has a record of the specific time that this customer desires the line restored to normal service and is informed as to whether or not the customer desires a notice of deactivation. When an incoming call is connected to the processor 74, the processor checks its file for the time to quote in the announcement which is to be provided to this caller. The announcement may be as before stated:

"I am sorry. The party you are calling has requested no interruptions until after 8 p.m. Please call again after 8 p.m. Thank you."

The processor 74 will then provide a disconnect signal. At the specified time for deactivation, the processor will generate a message over the recent change channel 82 to cancel call forwarding from this customer's line at the serving central office 48 in this example. If the notice of deactivation was selected the processor will also originate a call to the customer at station 50 over one of the notification of deactivation lines 100 via host office 72, IOF trunk 102 and serving central office 48. The processor's temporary memory associated with this customer's file will then be erased and made ready for the next usage.

It will be apparent from the foregoing that the invention provides an improved system and method for remote access to timed-do-not-disturb service on a high speed basis. The system and method is implemented from a centralized node or nodes assuring that human interface to the service is uniform across all types of switching systems. Such uniformity is important in a mass market service of the telephone type where instructions for use are customarily printed in the front pages of the telephone directory and where advertising is widespread in television and print media. Since the new adjunct platform itself is the user agent that provides the human interface, and the software in the platform can be adapted to the difference in maintenance channel protocols of the various switching system types, users may be assured of a uniform interface even as switching systems are changed.

The standalone centralized node approach also provides the ability to quickly modify, delete and add to the voice prompts and other service attributes. Thus when service scripts need to be changed such change may be effected within hours or days rather than having to wait for change of switching equipment software.

The centralized node approach also permits the new service to be presented in a large area quickly. All of the installation is accomplished in one centralized location where the platform is installed and tied into the existing links to every switching system in the area. Once this physical work is done, the service can be introduced simultaneously to all of the switching systems in the area rather than having to deal with every switch. It is additionally possible to add new service software and to modify the operation of the feature by implementing new codes in one central computer rather than in every switch.

Still other advantages of the present invention will be apparent to those skilled in the art from the foregoing detailed description, wherein only the preferred embodiments of the invention are shown and described, simply by way of illustration of the best mode contemplated of carrying out the invention. As will be realized, the invention is capable of other and different embodiments without departing from the invention. Accordingly the drawing and description are to be regarded as illustrative and not restrictive in nature.

I claim:

1. In a telecommunications system having a plurality of switching means interconnected by trunks, a plurality of subscriber stations arranged in groups with each group being served by one of said switching means, a plurality of subscriber lines connecting each switching means with the group of subscriber stations served thereby, a switching network in each switching means for establishing communication paths between calling subscriber stations and called subscriber stations addressed by the calling stations, at least one of said switching means including means for providing call forwarding services to subscriber stations served thereby, computer means associated with said switching means and adapted to respond to input signals to generate recent change signals to program switch translation variables in said switching means, and terminals connected to said computer means for entering programming orders, the improvement comprising:

adjunct means associated with said computer means and connectable to at least one of said switching means which includes means for providing call forwarding services to subscriber stations served thereby;

a multiline hunt group associated with a do-not-disturb service access number;

said adjunct means including:

voice response means connected to said multiline hunt group; and processor means responsive to subscriber identification and stored class of service information (a) for recognizing that a do not disturb service is to be provided to a subscriber station connected to one of said switch means including means for providing call forwarding services to subscriber stations served thereby, and (b) for generating a signal for programming said switch means in the circuit to said subscriber station so as to effect the modification necessary to provide the call forwarding and do not disturb service to that subscriber station; and said processor means being connected between said computer means and at least one of said switch means for transmitting to said switch means signals from said computer means.

2. A telecommunications system according to claim 1 wherein said switch means connected to said processor means receives from said processor means first switch translation programming signals responsive to signals from said computer means to said processor means, and second switch translation programming signals from said processor means responsive to commands from said multiline hunt group.

3. A telecommunications system according to claim 2 including means associated with said processor means for multiplexing said first and second switch translation programming signals.

4. A telecommunications system according to claim 1 including a second multiline hunt group connectable between said adjunct means and said switching means which includes means for providing call forwarding services for providing do not disturb announcements in response to forwarded calls.

5. A telecommunication system according to claim 4 including a line means connectable between said adjunct means and said switching means which includes means for providing call forwarding services for providing deactivation announcements in response to deactivation of said call forwarding and do not disturb services.

6. A telecommunication system according to claim 1 including a line means connectable between said adjunct means and said switching means which includes means for providing call forwarding services for providing deactivation announcements in response to deactivation of said call forwarding and do no disturb services.

7. A telecommunication system according to claim 1 wherein said adjunct means buffers programming signals generated by said processor means responsive to signals received from said multiline hunt group with signals received from said computer means.

8. A telecommunication system according to claim 1 including terminal means connected to said computer means for entering programming orders to be processed by said computer means for programming said switching means, wherein said adjunct means buffers programming signals generated by said processor means responsive to signals received from said multiline hunt group with signals received from said computer means responsive to signals received from said terminal means.

9. A method for remotely programming for timed-do-not-disturb services switch means in a telecommunications system having a computer means associated therewith and adapted to respond to input signals to generate recent change signals to program switch translation variables in said switching means comprising the steps of:

- detecting at a node between said switch means and said computer means the receipt of a remotely transmitted signal requesting timed-do-not-disturb service programming of said switch means;
- storing at least a portion of said request signal at said node;
- detecting at said node the receipt of recent change programming signals from said computer means;
- storing at least a portion of said recent change programming signals at said node;
- transmitting from said node to said switch means multiplexed programming signals for effecting recent change programming and special service programming of said switch means.

10. A method for remotely programming and providing timed-do-not-disturb services through switch means in a telecommunications system having multiple switch means and a computer means associated with said multiple switch means and adapted to respond to input signals to generate recent change signals to program switch translation variables in said switch means comprising the steps of:

- detecting at a node connected between said switch means and said computer means the receipt of a remotely transmitted signal requesting timed-do-not-disturb service programming of at least one of said switch means;
- storing at least a portion of said request signal at said node;
- formatting said stored request signal into recent change programming format and storing said formatted signal ready for release;
- detecting at said node the receipt of recent change programming signals for at least one of said switch means from said computer means;
- storing at least a portion of said recent change programming signals at said node;
- sequentially transmitting said stored programming signals from said node to said switch means to effect recent change programming and timed-do-not-disturb service programming of said switch means;
- thereafter forwarding calls to a timed-do-not-disturb customer served by said one switch means through said switch means to said node;
- retrieving at said node at least a portion of said stored request signal; and
- transmitting from said node timed-do-not-disturb responses to said calls.

11. A method according to claim 10 including the steps of:

- detecting at said node a remotely transmitted signal identifying the switch means in said multiple switch means for which a timed-do-not-disturb service request signal is intended;
- storing said identifying signal; and
- effecting said formatting responsive to the identity of the switch means for which the timed-do-not-disturb service request signal is intended.

12. A method according to claim 10 including the step of:

- transmitting a recent change programming signal from said computer means directly through said node to one of said switch means in the absence of a timed-do-not-disturb service request signal in said node.

* * * * *